United States Patent Office 3,303,115
Patented Feb. 7, 1967

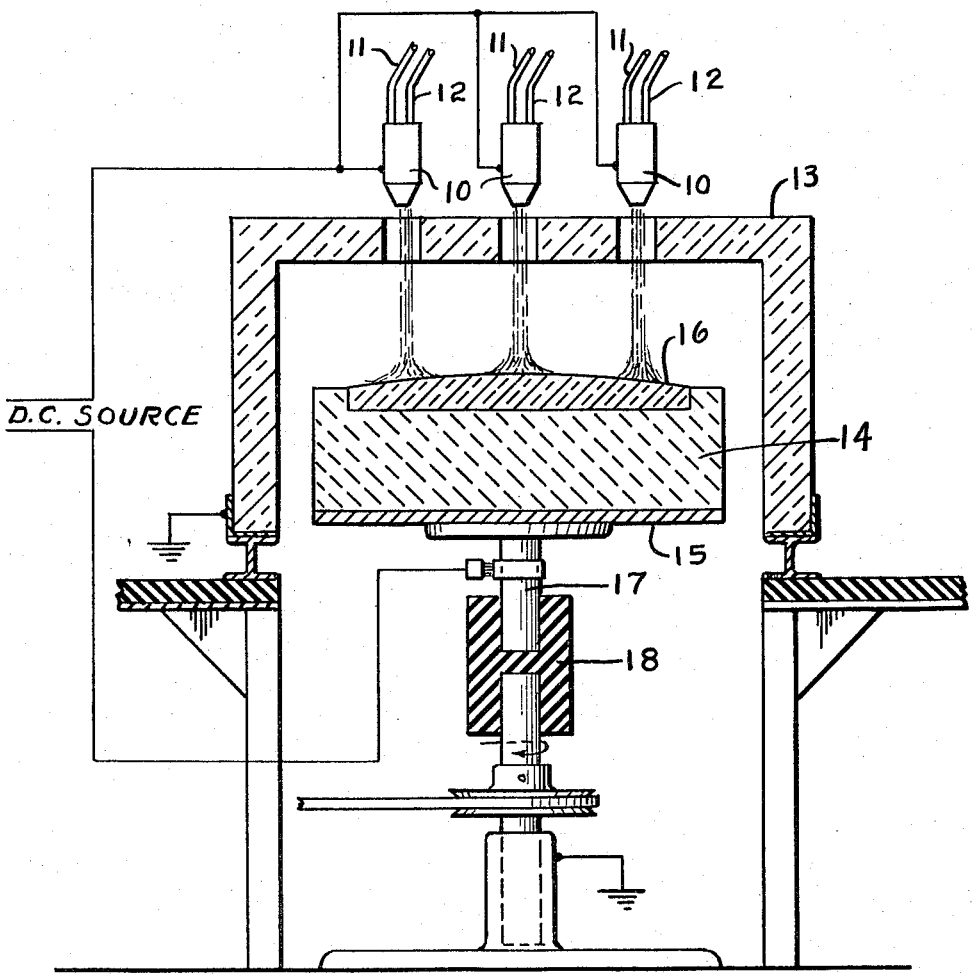

3,303,115
METHODS FOR FORMING MATERIALS OF HIGH PURITY BY FUSION
Joseph E. Nitsche, Corning, N.Y., assignor to Corning Glass Works, Corning, N.Y., a corporation of New York
Filed May 31, 1962, Ser. No. 198,820
11 Claims. (Cl. 204—130)

This invention relates to the production of glasses and ceramics by processes wherein boules of such materials are built up by the deposition of molten particles thereof and their fusion into solid masses, and more particularly to an improved method for removing impurities therefrom and for improving the properties thereof.

It has long been known that silica articles may be produced by the vaporization of a hydrolyzable compound of silicon into a flame to decompose the compound to form fine particles of silica, which may be fused into a solid article either by causing the flame to impinge on the particles as they are accumulated into a single mass or by heating the entire mass subsequent to its deposition. Examples of this process for forming silica articles are disclosed in U.S. Patent 2,272,342, issued to J. F. Hyde.

It is also well known that articles may be produced by passing through a flame a powder of a material from which it is desired to form an article and subsequently collecting the melted powder in the form of a boule. This process, generally known as the Verneuil process, may be employed, for example, in manufacturing articles from silica and alumina.

It has recently been discovered that the properties of articles formed of silica can be improved by maintaining the articles at elevated temperatures under the influence of imposed electrical potentials for times sufficient to effect migration of ionic impurities found therein. Among the advantages resulting from such electrolysis are reduction of variations in index of refraction and removal of certain undesirable absorption bands, as disclosed in U.S. Patent 2,897,126 issued to Henri George, and improvements in characteristics such as signal attenuation when fused silica is utilized in ultrasonic delay lines, as disclosed in copending application Number 774,252, filed November 17, 1958, now Patent No. 3,051,915.

Although such electrolysis of finished silica articles produces satisfactory results, it will be apparent that the additional step in the manufacturing process increases the length of time consumed in production and results in concomitant increases in production costs.

The present applicant has discovered that this additional step may be eliminated, and articles of silica, as well as other materials formed by the deposition and fusion of powders to form boules, may be built up and electrolyzed simultaneously and will exhibit the characteristics shown by articles which have been electrolyzed in the previously known manner.

The means and method of the present invention are described with reference to the accompanying drawing, which represents one form of apparatus utilized in simultaneously forming and electrolyzing fused silica.

Although the invention will be described with reference to the process for forming a boule of silica by the decomposition of a silica compound in a flame and deposition of the silica particles so formed, it will be understood that the invention is equally applicable to processes wherein particles having the same composition as the final article are deposited as a boule after heating in a flame. Such particles may be, for example, those of silica and alumina.

Referring to the drawing, there are provided a plurality of gas-oxygen burners 10 having inlet tubes 11 for supplying oxygen to the burners and inlet tubes 12 for supplying to the burners a combustible gas having vapors of a hydrolyzable compound of silicon, for example $CiCl_4$, premixed therewith according to the teaching of the above-mentioned Hyde patent. The $SiCl_4$ is hydrolyzed to form fine particles of $SiO_2$, which pass through ports in hood 13 and fall onto conducting refractory 14, which may be silica brick, which is electrically conducting at the temperatures utilized in the present process and which is supported on rotating table 15. The air within hood 13 is maintained at elevated temperatures by the action of the burners, and the tips of the burner flames preferably impinge upon the surface of silica boule 16 to effect vitrification thereof and to maintain the boule at temperatures sufficient to permit electrolysis thereof, such temperatures preferably being those above 850° C.

Burners 10, rotating table 15, and shaft 17 comprise conducting metals, for example steel, and a direct current electrical potential is applied between the burners and the rotating table, as illustrated by the circuit shown in the drawing. In the illustrated embodiment, rotating table 15 is the cathode, and burners 10 are anodes, the consequence being that positively charged alkaline impurities collect at the interface between fused silica boule 16 and refractory 14, while negatively charged impurities migrate to the upper surface of boule 16 and, in the case of gases, escape into the atmosphere.

It will be apparent that the electrical polarity of the system may be reversed with satisfactory results. Shaft 17 is provided with insulating bushing 18 to prevent electrical discharge to ground. Hood 13 and the lower portion of shaft 17 are grounded, as illustrated.

Varying voltages may be employed to effect electrolysis of the boule during its formation, the speed of electrolysis being a function of the current passing through the circuit which comprises the wires, the steel burners, the ionized gases in the flame, the heated boule, the electrically conducting refractory, and the steel table and associated shaft, to which electrical contact is made by means of a brush contact. When the separation between burners 10 and the surface of boule 16 is 6 inches and the fused silica is at a temperature of 1700° C. a potential of 500 volts is satisfactory.

It will be understood that silica brick refractory 14 is utilized to protect the surface of steel table 15 from the effects of heat and corrosion but is not essential to the process. Hood 13 assists in maintaining boule 16 at elevated temperatures but is likewise not essential. In addition, although preferable both to vitrify the boule and to facilitate current flow, it is not essential that the tips of the flames impinge upon the boule, sufficient ionized gas being present to permit current flow.

It will be understood that some degree of electrolysis will take place in the present process whenever there is any potential difference across the silica boule, and as long as the boule is maintained at temperatures high enough to permit migration of impurity ions. Although the present invention is not to be limited thereby, it may be stated that for silica boule formation preferred ranges for temperatures and voltages are generally within the limits 850°–1900° C. and 40–4,000 volts per inch of separation between the burners and the surface upon which the silica boule is formed. When an alumina boule is formed according to the Verneuil process, corresponding ranges are 1000°–2100° C. and 40–4,000 volts per inch.

It will also be understood that the process of the invention may continue after the deposition process has been completed. The flames may continue to be directed onto the boule, and the potential may remain, thereby continuing the electrolysis of the boule. Alternatively, the potential may be applied only after the deposition is complete.

What is claimed is:

1. In the method of manufacturing a solid body of a material selected from the group consisting of silica and alumina and having therein ionic impurities capable of migration under the influence of an electric field, which comprises the steps of producing molten particles of said material and depositing said particles to form a single fused mass, the improvement which comprises maintaining a direct current electric field across said single mass during the deposition of said particles while maintaining said mass at an elevated temperature and thereby effecting movement of said ionic impurities therein toward a surface thereof.

2. In the method of making a solid body of silica, which comprises the steps of vaporizing a hydrolyzable compound of silicon into a flame to decompose said compound to form particles of silica having therein ionic impurities capable of migration under the influence of an electric field and depositing said particles to form a single fused mass of silica, the improvement which comprises maintaining a direct current electric field across said single mass during its deposition, while maintaining said mass at an elevated temperature, and thereby effecting electrolysis of said mass to move said ionic impurities toward a surface thereof.

3. The method according to claim 2 in which said electric field is within the range 40–4,000 volts per inch and said temperature is within the range 850°–1900° C.

4. In the method of making a solid body of silica, which comprises the steps of vaporizing a hydrolyzable compound of silicon into a flame to decompose said compound to form particles of silica having therein ionic impurities capable of migration under the influence of an electric field and depositing said particles to form a single mass of silica, the improvement which comprises maintaining a direct current electric field between said flame and said single mass while maintaining said mass at an elevated temperature and thereby effecting electrolysis of said mass to move said ionic impurities toward a surface thereof.

5. The method of making a solid body of silica which comprises injecting the vapors of a hydrolyzable compound of silicon into a flame from a burner which comprises an electrically conducting material to produce fine particles of silica having therein ionic impurities capable of migration under the infleunce of an electric field and collecting said particles on an electrically conducting base to form a mass of silica, while maintaining a direct current electric field between said burner and said base, whereby said ionic impurities are moved toward one surface of said mass.

6. The method according to claim 5 in which said flame impinges upon said mass of silica.

7. The method according to claim 5 in which said mass of silica is maintained at temperatures above 850° C.

8. The method according to claim 5 in which a hood is provided to maintain the atmosphere between said burners and said mass of silica at elevated temperatures.

9. The method of removing ionic impurities from an article formed from a material selected from the group consisting of silica and alumina, which comprises the steps of supporting said article on an electrically conducting surface and directing a flame from a burner on an exposed surface of said article, while maintaining a direct current electrical potential between said burner and said conducting surface, whereby said ionic impurities are moved toward a surface of said article.

10. The method of forming a solid body of alumina which comprises the steps of melting particles of alumina in a flame from a burner comprising an electrically conducting material and depositing said melted particles on an electrically conducting base to form a single mass, said particles of alumina having therein impurities capable of migration under the influence of an electric field, while maintaining said mass at an elevated temperature and maintaining a direct current electric field between said burner and said base, and thereby effecting electrolysis of said mass to move said ionic impurities toward one surface thereof.

11. The method according to claim 10 wherein said temperature is within the range 1000°–2100° C. and said electric field is within the range 40–4,000 volts per inch.

References Cited by the Examiner

UNITED STATES PATENTS

| 1,051,060 | 1/1913 | Balke | 204—241 |
| 1,710,535 | 4/1929 | Fowler | 204—241 |
| 2,272,342 | 2/1942 | Hyde | 65—33 |
| 2,793,181 | 5/1957 | Visnapuu | 204—130 |
| 2,793,182 | 5/1957 | Visnapuu | 204—130 |
| 2,897,126 | 7/1959 | George | 204—130 |
| 2,927,042 | 3/1960 | Hall et al. | 204—130 |

FOREIGN PATENTS 795,191    5/1958    Great Britain.

JOHN H. MACK, *Primary Examiner.*

JOHN R. SPECK, MURRAY TILLMAN, WINSTON A. DOUGLAS, *Examiners.*

G. KAPLAN, L. G. WISE, H. M. FLOURNOY,
*Assistant Examiners.*